United States Patent [19]

Martin et al.

[11] Patent Number: 4,606,072
[45] Date of Patent: Aug. 12, 1986

[54] MASTER/SLAVE CONVERTER SYSTEM

[75] Inventors: Thomas F. Martin, Richardson; Robert W. Storey, Dallas; Carl F. Schoenenberger, Carrollton; John S. Chenoweth, Denton, all of Tex.

[73] Assignee: Tocom Inc., Irving, Tex.

[21] Appl. No.: 786,144

[22] Filed: Oct. 8, 1985

Related U.S. Application Data

[63] Continuation of Ser. No. 503,397, Jun. 10, 1983, abandoned.

[51] Int. Cl.4 ........................ H04H 1/04; H04N 7/00
[52] U.S. Cl. ............................................ 455/4; 455/5; 455/6; 358/86; 358/114
[58] Field of Search ........................................ 455/2-6, 455/53, 56; 375/7, 8, 36; 358/84, 86, 114

[56] References Cited

U.S. PATENT DOCUMENTS

| | | | |
|---|---|---|---|
| 3,803,491 | 4/1974 | Osborn | 455/5 |
| 3,806,814 | 4/1974 | Forbes | 455/5 |
| 3,886,302 | 5/1975 | Kosco | 455/4 |

Primary Examiner—Jin F. Ng
Attorney, Agent, or Firm—Hopgood, Calimafde, Kalil, Blaustein & Judlowe

[57] ABSTRACT

A multiple converter system is provided for a remote user in a cable communications system. The converters at the user location are linked together via a splitter. One converter operates as a master converter transmitting a master control signal to the other converters, designated as slave converters. The slave converters are actuated only upon reception of the master control signal. The master control signal is interrupted by the master converter only when it transmits data upstream to the central office or when one of the slave converters is required to transmit data. A slave converter notifies the master converter of the need to transmit data by a slave signal. A transmitter unit is automatically activated for transmitting data upstream upon the absence of the master signal on the bus.

15 Claims, 7 Drawing Figures

MASTER/SLAVE CONVERTER SYSTEM

This appllication is a continuation of application Ser. No. 503,397 filed June 10, 1983, now abandoned.

BACKGROUND OF THE INVENTION

The present invention concerns a method and apparatus for a master/slave multiple converter system. More particularly, the present invention is concerned with a cable television system having multiple converters at a subscriber location linked together in a master/slave interdependency relationship.

In cable television communication systems, information is processed at each subscriber drop point by a converter, which tunes the transmitted signals to a frequency compatible to the subscriber's television set. The converter may also decode the signal if it has been scrambled at the headend and extract information from the vertical interval of the signal for internal control or for text display on the television screen.

Frequently, for various reasons, a subscriber will lease a system having multiple converters. The subscriber may utilize one converter for general family use and require several additional converters for various specialized uses, such as home security and data bank access.

To encourage the use of multiple converter systems, cable operators offer substantial unit discounts for the lease of additional converters. However, such package arrangements enable unscrupulous subscribers to share their converters with unauthorized parties who thereby avoid the initial subscription charge. Such use is difficult to monitor or detect and leads to substantial subscription losses for cable operators.

SUMMARY OF THE INVENTION

The present invention is directed to a multiple converter system utilized at a remote user location in a cable television communication system. One converter in the system is designated as a "master" converter which communicates with the other converters at the user location, designated as "slave" converters. The master converter provides a master control signal to the slave converters via a splitter. The slave converters are activated only upon reception of the master control signal and are useless unless the master signal is received. The master control signal is interrupted only when the master converter or one of the slave converters transmits data to the central office.

In a preferred embodiment of the present invention, a multiple converter system is provided for a remote user in a data communications system. The data communications system preferably has a transmitter at the central office for transmitting data signals over a communications link to a plurality of converters at a user's location. The multiple converter system includes a master converter having supervisory means for generating a control signal. At least one slave converter is in communication with the master converter and has actuating means responsive to the control signal from the master converter for enabling the slave converter only after receiving the control signal.

In another more specific embodiment, a master converter is provided at a remote user location in a cable communication system. The master converter is connected to at least one slave converter. A splitter unit provides data signals from the central office to all of the converters in the system and passes data from the master and slave converters back to the central office. The master converter provides a DC offset binary control signal which is passed, through a splitter unit to each slave converter. The slave converters are enabled only upon reception of the master converter signal.

The foregoing system prohibits cable subscribers from sharing their extra converters with unauthorized users, thereby eliminating loss of subscription revenue to unauthorized users previously suffered by cable operators. If a slave converter is removed from the subscriber system, it will not activate without the master converter activation signal. Likewise, if a master converter is taken by an unauthorized user, the remaining slave converters of the subscriber will not operate.

The concept of the present invention is not necessarily limited to cable television but can be applied to subscription television and other closed circuit television systems. In addition, the process may be utilized in a data communications system not involving television transmission, where converters are used. The concept of the present invention may be utilized with addressable or non-addressable converters and in one-way or two-way cable communication systems.

BREIF DISCRIPTION OF THE DRAWINGS

The novel featues believed to be characteristic of the invention are set forth in the appended claims. The preferred mode of the present invention, as well as further objects and advantages thereof, will best be understood by reference to the following detailed description of a preferred embodiment when read in conjunction with the accompanying drawings wherein:

DETAILED DESCRIPTION OF THE DRAWINGS

Figure 1:
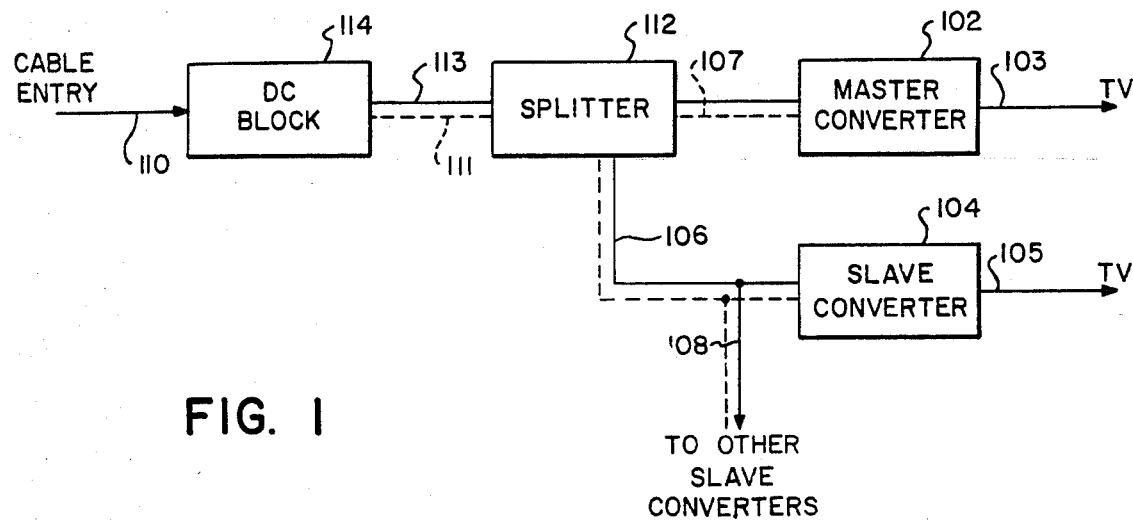
FIG. 1 is a block diagram of a preferred embodiment of the present invention disclosing a multiple converter system in a one-way cable communication system.

With reference now to FIG. 1, a multiple converter user system 100 is shown as a preferred embodiment of the present invention. System 100 includes a master converter 102 and a slave converter 104 electrically connected together by a subscriber control bus 106. Cable communication data and programming signals are provided by cable entry line 110 connecting to a cable plant at a subscriber drop point (not shown). The cable entry line passes these signals to converters 102 and 104 by way of a suitable splitter 112 which is connected to subscriber control bus 106. Splitter 112 divides the cable signals into multiple signals, one for each converter in the user system. A conventional DC blocking unit 114, such as a capacitor, is positioned on cable entry line 110 upstream of splitter 112 to block transmission of DC offset square wave signals which are passed between the converters.

It will be understood that additional slave converters may also be connected in parallel on an extension of subscriber control bus 106 shown at 108. Preferably master converter 102 and slave converters 104 utilize identical circuitry and are different only in the programming of the microprocesser, as described herein.

Figure 2:
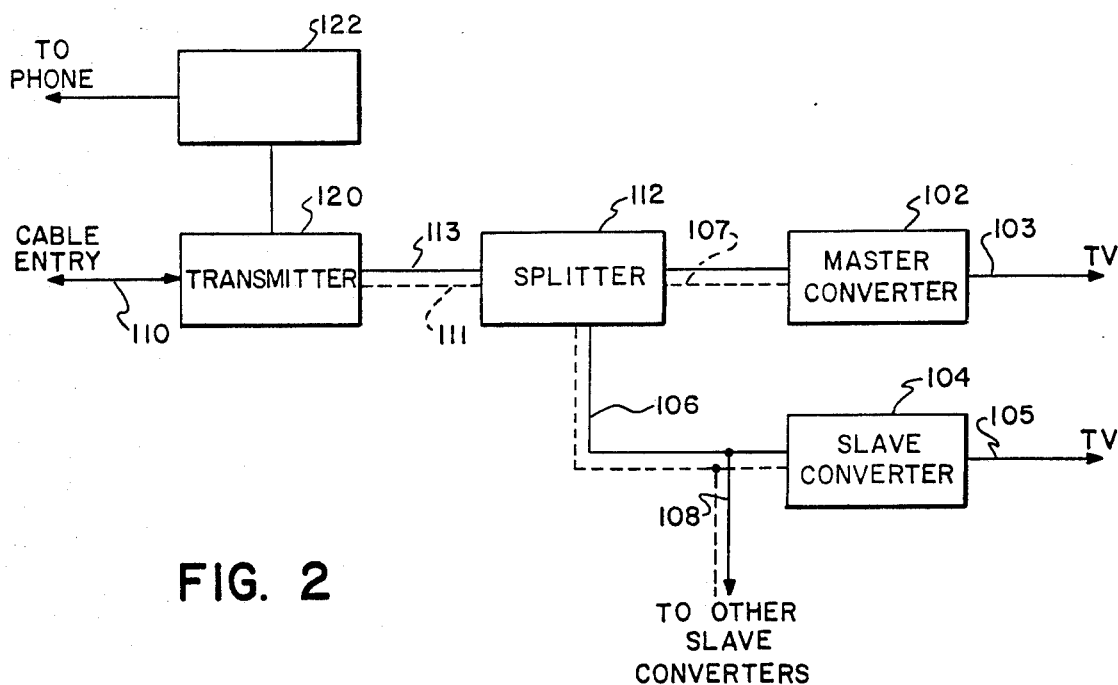
FIG. 2 is a block diagram of an alternate preferred embodiment of the present invention showing multiple converters in a two-way cable communication system.

FIG. 2 discloses an alternate preferred embodiment of the present invention in a cable communication system having two-way capability to communicate to the central office using a transmitter such as a telephone dialer or an R-F transmitter. Master converter 102 slave converter 104 and splitter unit 112 are substantially identical to those disclosed in FIG. 1. Likewise, subscriber control bus 106 and cable entry line 110 are unchanged from that disclosed in FIG. 1. To enable upstream communication, a transmitter unit 120 is shown on cable entry line 110 connected to splitter unit 112 by line 113 as shown. Preferably, the conventional DC blocking circuitry 114 in FIG. 1 is embodied internally in transmitter unit 120. A transformer 122 is connected to transmitter unit 120 for transforming the data signal voltage preparatory to transmission to the central office.

In both FIG. 1 and FIG. 2, the master and slave converters have output lines 103 and 105, respectively, which direct signals to the subscriber units, usually television sets. Also, in FIGS. 1 and 2, dotted line 107 running parallel to subscriber control bus (SCB) 106 and dotted line 111 running parallel to cable entry line 110 signify low frequency data paths communicating the master control signal between the master converter 102 and the slave converters 104 via splitter 112. In the two-way system of FIG. 2, the dotted line also represents low frequency data being sent from the converters to the transmitter 120.

Figure 3:
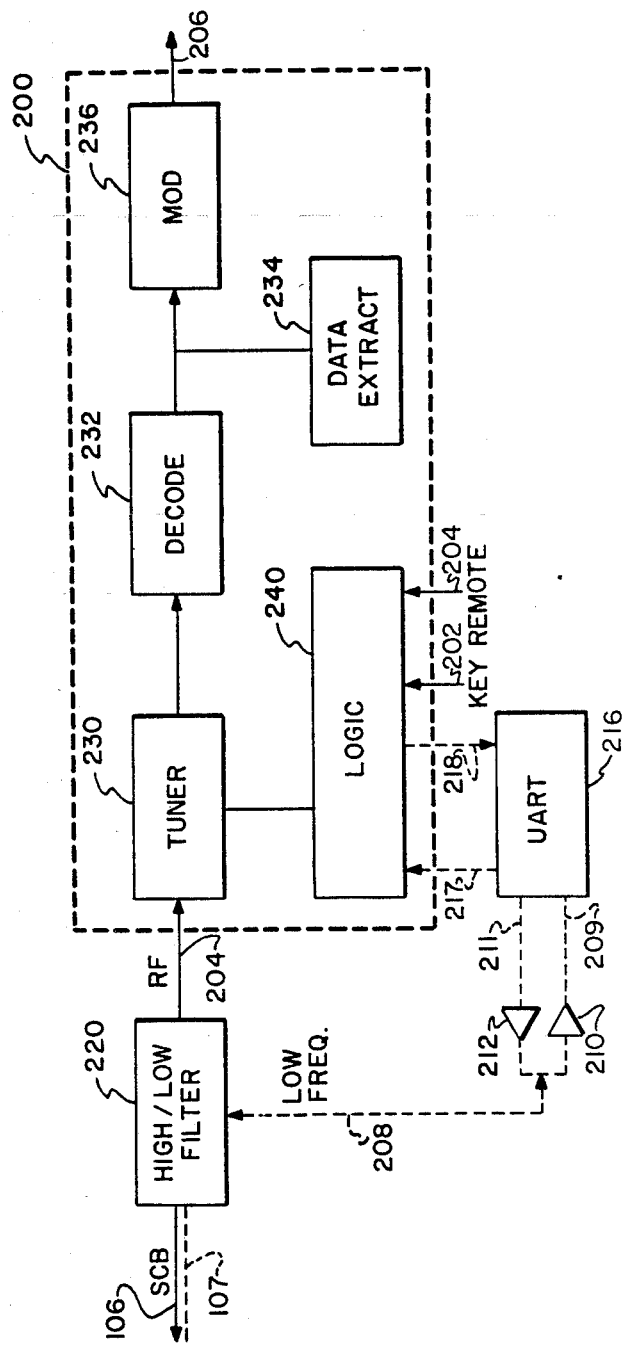
FIG. 3 is a block diagram of a preferred embodiment of one of the converters shown in FIG. 1.

Turning now to FIG. 3, a block diagram shows the layout of master converter 102. It is understood that slave converter 104 preferably has identical circuitry to that shown in FIG. 3. Master converter 102 utilizes a conventional converter unit 200 having keyboard and remote inputs 202 and 204 from the user and a R-F signal output 206 to the user's television set. Converter unit 200 is preferably a conventional unit such as model 5504B made by Tocom, Incorporated of Irving, Tex.

Interfacing between the subscriber control bus 106 and converter 200 is a conventional high/low filter unit 220. This unit separates the R-F high frequency television program signals and data signals from the low frequency control signal transmission between converters at the remote user location and the low frequency data signals from the converters to the transmitter. The R-F signals are transmitted on line 204 to converter 200. The low frequency control data signals are transmitted on data line 208 (indicated by a dotted line) through a conventional input buffer 210 to a conventional receiver/transmitter unit 216 such as a universal asychronous receiver transmitter unit (UART). Return data from unit 216 is transmitted through a conventional output buffer 212 along data line 208 back to the high/low filter unit 220.

The R-F signals are processed in a conventional manner by converter 200. The signals are demodulated by a tuner 230 and are descrambled by a decoder 232, both under the direction of logic unit 240. A data extractor 234 removes data from the vertical interval of the demodulated signal and transmits it to logic unit 240 for control processing. The signal is then remodulated by modulator 236 to a frequency compatible for the user's television set and is output on line 206.

UART unit 216 provides the input/output data link with logic unit 240. The master control signal transmitted between converters is processed by UART unit 216. Also, the UART unit 216 transmits converter data from logic unit 240 back to the central office, by way of transmitter 120, shown in FIG. 2.

UART unit 216 comprises conventional circuitry, preferably UART chip no. 6402 made by Intersil Corporation. Buffer units 210 and 212 comprise simple open-collector common grounded-emitter transistor circuitry buffering the input and output data.

Figure 4:
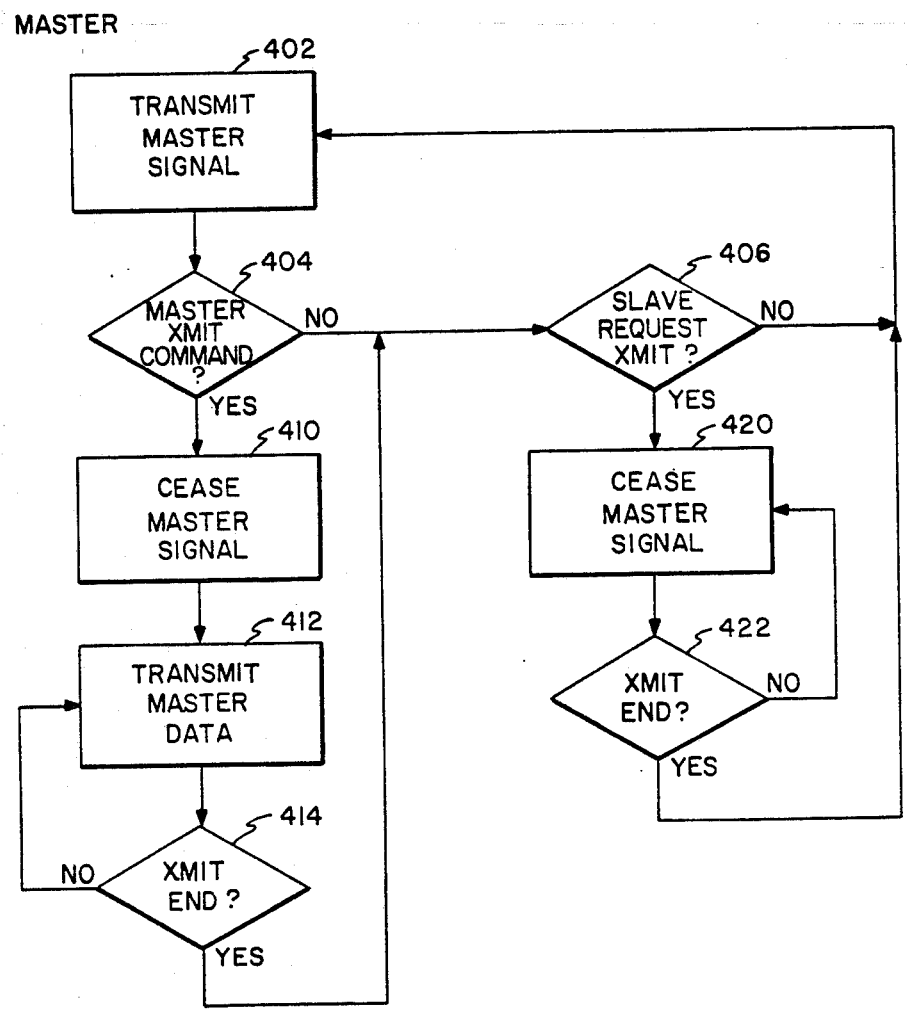
FIG. 4 is a logic flow diagram of the operation of the master converter shown in FIG. 1.
Figure 5:
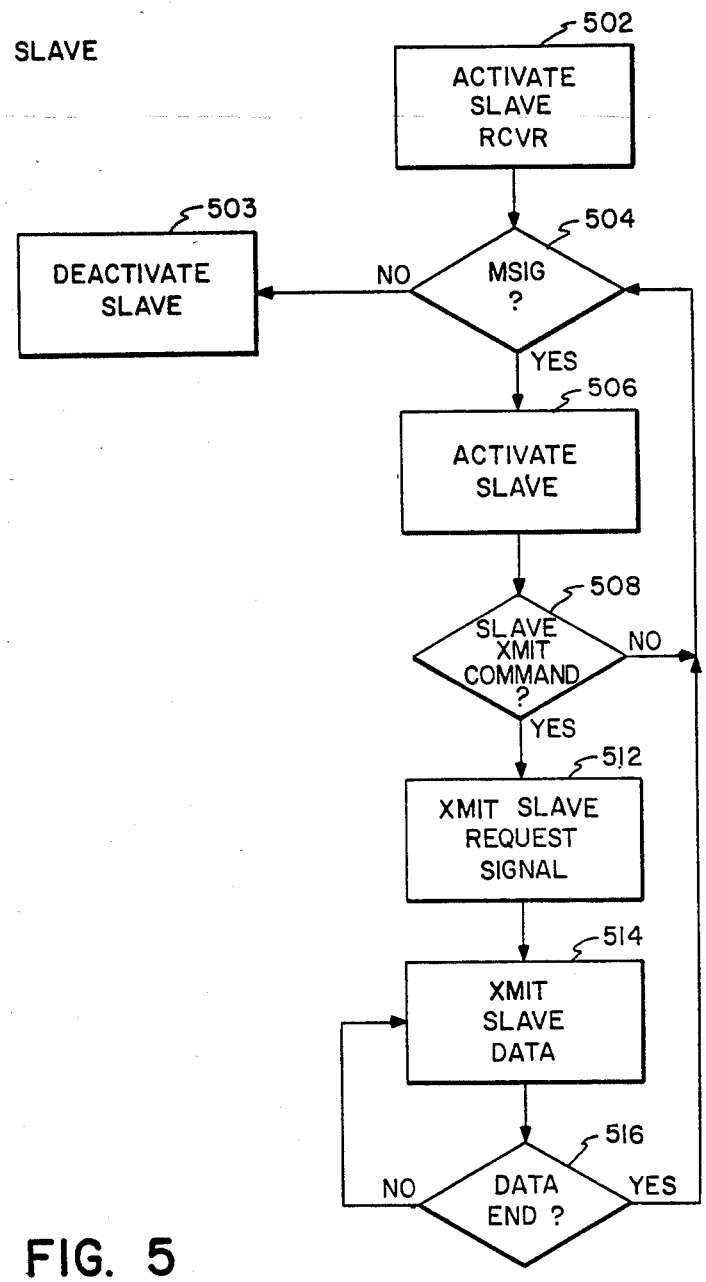
FIG. 5 is a logic flow diagram of the operation of the slave converter shown in FIG. 1.

Referring now to FIGS. 4 and 5, logic diagrams describe the operation of master converter 102 and slave converter 104, respectively. Reference will be made to FIGS. 1 to 3 during the description of FIGS. 4 and 5 to identify the elements carrying out the logic steps shown therein. As shown in FIG. 4, at step 402, the master converter outputs a master control signal on subscriber control bus 106. Preferably this is a simple DC offset square wave the center conductor of the SCB 106. The master converter 102 interrupts this pattern only to transmit data or to allow a slave converter 104 to transmit data upstream to the central office, sometimes referred to as the headend.

The slave converter senses the presence of a master converter on the SCB 106 by detecting the presence of the master signal. If it fails to detect the master signal of the master converter within a short period of time, preferably no more than 10 seconds, the slave converter is disabled. The slave converter 104 will transmit its data upstream only when commanded to do so by the central office and only after the master converter 102 has interrupted its master signal.

Referring more specifically to FIG. 4, at step 402, the master converter 102 transmits its master signal, preferably a DC offset square wave, to activate slave converters 104. At decision block 404, master converter 102 inquires as to whether the central office has tranmitted a signal commanding the master converter to send its data upstream to the home office. If not, a similar test is made at step 406 to determine whether a slave converter 104 has received a similar command from the central office and requests to transmit its data. If not, the master converter continues to transmit its master signal as indicated at logic step 402.

If a central office command is received by the master converter, its ceases transmitting its master signal at step 410 and begins transmitting the data from the master converter 102 to the central office as shown in logic step 412. Master converter 102 continues transmitting as shown on decision block 414 until the transmission is completed. At that time, a test is again made to determine whether the slave converter 104 needs to transmit data to the central office. If not, the master converter resumes transmission of its master signal as shown in logic step 402.

If one of the slave converters 104 has been commanded to transmit its data to the central office, the master converter ceases transmission of its master signal as indicated at logic step 420 and continues to test for the end of the slave data transmission at decision block 422 until the transmission is finished. At that time, master converter 102 resumes transmission of its master signal as shown at logic step 402.

In FIG. 5, the specific steps carried out by the slave converter 104 is shown. The slave converter first activates its receiver, preferably the receiver portion of UART unit 216 disclosed in FIG. 3, as shown at logic step 502. The rest of the slave is not activated until it detects the presence of a master signal, as shown at step 504. At that time, the slave converter 104 is activated, as shown at step 606, and an inquiry is made, at decision step 508, as to whether the central office has commanded transmission of the slave converter data. If not, the slave converter continues to test for the presence of the master signal on SCB 106 as shown at logic step 504. If a master signal is not received, the slave is deactivated, as shown at step 503, only the slave receiver remaining active to test for the resumption of master signal transmission.

If the central office commands transmission of the slave converter data, then slave converter 104 transmits a request transmission signal to the master converter 102 on SCB 106 as shown at logic step 512. This slave signal notifies the master converter of the need for the slave converter to transmit data over SCB 106 and effectively requests the master converter to cease transmitting its master signal. The slave converter then assumes that the master signal has ceased and then begins to transmit its data, at step 514, to the central office. The slave converter tests for the end of the data transmission at logic step 516 and continues transmission until the data has been sent. At that time, the slave converter again tests for the master signal at decision block 504 and if the master signal is present, the slave converter remains activated.

Looking again at FIG. 3, a more specific description is provided of the preferred embodiment of the master and slave converters 102 and 104 and the signals sent between those converters. As previously mentioned, the master signal from the master converter 102 is preferably a DC binary signal equivalent of a square wave switching between 0 and 5 volts. The square wave frequency can fall anywhere between 100 and 1,000 hertz, preferably being at about 300 hertz. This signal is generated by logic unit 240 and transmitted by UART unit 216 on lines 211 and 208 to R-F/data separator unit 220 to SCB 106. The master signal of master converter 102 is also fed back from SCB 106 on lines 208 and 209 to the master converter. Thus, the master converter can sense the condition on SCB 106 to determine that the slave converters are open and receiving the master signal. If a slave converter needs to send a signal to the central office, the slave converter sends a request to transmit signal to the master conerter. Preferably this is done by the slave converter simply grounding input line 209, thereby pulling data line 208 and hence SCB 106 to ground. This grounded bus 106 is sensed by master converter 102 through its input buffer circuitry line 209. The master converter thereby determines that a slave converter needs to transmit its data to the home office, and ceases transmission of its master signal on SCB 106 until the slave converter completes transmission. Preferably, the master converter is programmed to automatically resume transmission of the master signal after a predetermined period of time.

Preferably, the master signal is also used to control the return transmitter unit 120 of the alternate embodiment shown in FIG. 2. Transmitter 120 is preferably automatically activated whenever it senses an absence of the master signal for a predetermined period of time. Transmitter unit 120 remains activated until the data transmission ceases for a predetermined period of time. Once the master signal is received, transmitter unit 120 turns off and remains off until one of the converters is again ready to transmit. Using this approach, no separate control line is required to activate and deactivate transmitter unit 120.

Figure 6:
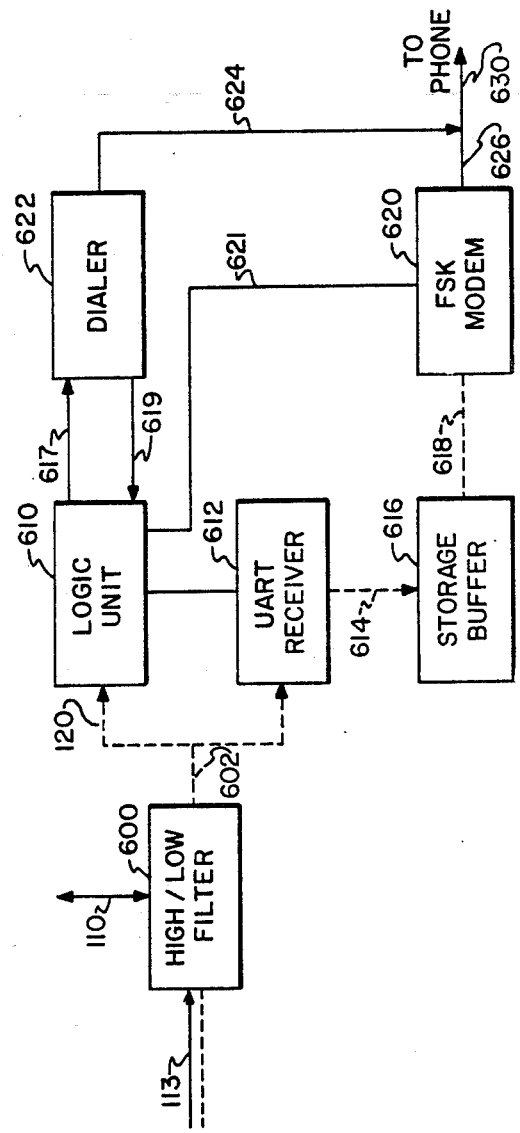
FIG. 6 is a block diagram of the transmitter shown in FIG. 2.

With reference now to FIG. 6, a preferred embodiment of transmitter 120 is shown wherein the transmitter is a telephone dialing system for sending the master or slave converter data to the central office over a telephone line. Cable line 113 connects with line 120 with splitter 112 feeds into a conventional high/low filter 600, preferably similar to high/low filter 220, which separates the R-F program and data signals from the low frequency master control and data signals. The R-F program and data signals are output on cable entry line 110 for interface with the rest of the cable transmission system. The low frequency data information is output on line 602 which feeds to a logic unit 610 and a UART receiver 612. The UART receiver in turn feeds the low frequency data on line 614 to a storage buffer 616 which has an output 618 to a FSK modem transmitter unit 620. The low frequency data is also received by logic unit 610 having a two-way interface with a conventional telephone dialer 622 by way of lines 617 and 619. The logic unit also has a control output by line 621 to FSK modem unit 620. Dialer 622 outputs on line 624 to telephone line 630, and FSK modem 620 has an output line 626, also to phone line 630.

Figure 7:
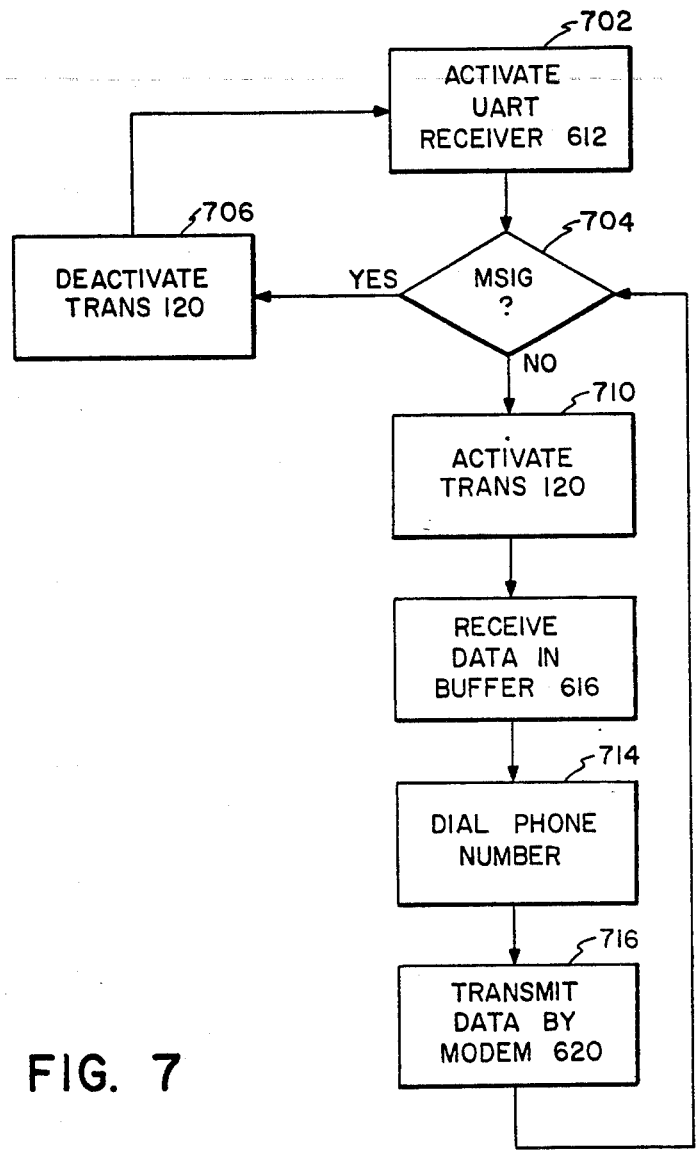
FIG. 7 is a logic flow diagram of the operation of the transmitter shown in FIG. 6.

Referring now to FIG. 7, transmitter 120 normally is turned off except for UART receiver 612 as shown at logic step 702. Receiver 612 continues to test for the presence of a master signal from the master converter, as shown at decision block 704. As long as the master signal is received, transmitter 120 remains deactivated as shown at step 706 except for the UART receiver 612.

When the master signal is turned off, transmitter 120 senses that data from one of the converters is about to be transmitted to the central office. The transmitter 120 is thereby fully activated at step 710 and receives the data at 712 through UART receiver 612 for storage in buffer 616. At the same time, logic unit 610 initiates dialer 622 which dials the appropriate telephone number for transmission to the central office, as shown at step 714. As soon as the central office is ready for transmission, dialer 622 informs logic unit 610 which then commands FSK modem 620 to transmit the converter data on telephone line 630. Once transmission has been completed, transmitter 120 goes back into the initial testing mode, looking for the presence of a master signal as shown at decision block 704. In a preferred mode, the master converter resumes transmission of its master signal as soon as the data burst has been transmitted to the storage buffer 616. Thus, by the time the data information has been transmitted on the telephone line, the UART receiver 612 has already been receiving the master signal for some time.

It is understood that a similar arrangement can be carried out in the event that transmitter 120 is an R-F transmitter in a two-way cable communication system rather than functioning as a dialer unit shown in FIG. 6. In most cases, if a R-F transmitter is utilized, there is no need for a storage buffer, and the data is transmitted directly by way of a FSK transmitter upstream on the coaxial cable interconnecting with the rest of the communication system.

While preferred embodiments of the present invention have been described herein, it will be understood that the present invention includes various changes and modifications obvious to those skilled in the art without departing from the spirit of the invention. It is, therefore, contemplated that the appended claims will include all such modifications or embodiments falling within the spirit and scope of the invention.

What is claimed is:

1. In a communication system having a central office and at least one remote user location having a plurality of converters a data transmitter, and a splitter connected between said transmitter and said converters a process comprising:
   transmitting a master control signal from a master converter at the remote user location to at least one slave converter at the same remote user location via said splitter;
   activating the slave converter only in response to reception of the master control signal;
   receiving a command signal from the central office for transmission of data in the master converter to the central office;
   terminating transmission of the master control signal at the remote user locations;
   transmitting the data from the master converter to the central office utilizing the data transmitter; and
   resuming transmission of the master control signal to the slave converters at the remote user location.

2. The process of claim 1 wherein the data transmitter is activated only upon interruption of reception of the master control signal.

3. In a communications system having a transmitter at a central office for transmitting data signals over a communications link to a user's location where the data signals are received and tuned for use thereat, the combination comprising:
   a master converter capable of tuning the data signals at the user's location having supervisory means for generating a master control signal,
   at least one slave converter capable of tuning the data signals in communication with the master converter having disabling means responsive to the master control signal from the master converter for disabling the slave converter in response to the absence of communication of the master control signal to the slave converter,
   splitter means in communication with the master converter and the slave converter for passing the data singals from the central office to the master and slave converters and wherein said master converter and slave converter are connected by the splitter means,
   whereby said converters are arranged in an interdependent relationship wherein said master converter is independently capable of tuning the data signals and said slave converter is capable of tuning the data signals only upon communication of said master control signal.

4. The system of claim 3 wherein the master control signal is a low frequency signal and the data signals from the central office are high frequency signals.

5. The system of claim 4 wherein the master control signal comprises a DC offset square wave.

6. The system of claim 4 and further comprising blocking means between the splitter means and the central office for preventing passage of the low frequency master control signal to the central office.

7. The system of claim 3 wherein the communication system is a cable system.

8. The system of claim 3 wherein the communication system is a cable television system and the data signals are R-F television program signals.

9. The system of claim 3 further comprising a transmitting means for transmitting data from the master converter to the central office, said transmitting means being actuable by the absence of communication of the master control signal to the transmitting means from the master converter.

10. The system of claim 3, wherein the master control signal is a low frequency signal, the data signals from the central office are high frequency signals and wherein the master converter and the slave converter each include filter means for separating the high frequency data signals from the low frequency master control signal.

11. In a two-way communication system for transmitting data signals between a central office and a plurality of remote user locations where the data signals are received and tuned for use thereat, the combination comprising:
    a master converter at a user's location capable of tuning the data signals having supervisory means for generating a master control signal,
    at least one slave converter at the user's location capable of tuning the data signals in communication with the master converter having actuating means responsive to the master control signal from the master converter for enabling the slave converter only upon reception of the master control signal,
    transmitter means in communication with the master and slave converters and upstream therefrom for passing data signals from the master converter and slave converter to the central office,
    splitter means in communication with the master converter and the slave converter for passing the data signals from the central office to the master and slave converters wherein the master converter and slave converter are connected by the splitter means,
    whereby said converters are arranged in an interdependent relationship wherein said master converter is independently capable of tuning the data signals and the slave converter is enabled only upon communication of said master control signal thereto.

12. The system of claim 11 wherein the transmitter means is deactivated in response to the master control signal.

13. The system of claim 11 wheren the master control signal is a low-frequency repetitive signal and the data singals are high frequency information carrying signals.

14. The system of claim 13 wherein the transmitter means includes circuitry for blocking transmission of the low frequency master signal upstream in the communication system.

15. The system of claim 14 comprising a two-way cable communications system.

* * * * *